Nov. 25, 1958 A. P. KRUPER ET AL 2,862,141

COLOR TELEVISION TUBE

Filed Feb. 19, 1954 5 Sheets-Sheet 1

WITNESSES:

Robert C. Baird

Charles F. Renz

INVENTORS
Andrew P. Kruper &
Charles H. Jones.
BY F. E. Browder
ATTORNEY

Nov. 25, 1958 A. P. KRUPER ET AL 2,862,141

COLOR TELEVISION TUBE

Filed Feb. 19, 1954 5 Sheets-Sheet 3

Nov. 25, 1958 A. P. KRUPER ET AL 2,862,141

COLOR TELEVISION TUBE

Filed Feb. 19, 1954 5 Sheets-Sheet 5

United States Patent Office 2,862,141

Patented Nov. 25, 1958

2,862,141

COLOR TELEVISION TUBE

Andrew P. Kruper and Charles H. Jones, Pittsburgh, Pa., assignors to Westinghouse Electric Corporation, East Pittsburgh, Pa., a corporation of Pennsylvania Application February 19, 1954, Serial No. 411,382

7 Claims. (Cl. 315—21)

This invention relates to image reproduction tubes and, more particularly, to color television image tubes.

It is an object of our invention to provide a new and improved television tube for the reproduction of an image in natural color.

It is another object to provide a new and improved color television tube of simple construction.

It is another object to provide an improved color television tube capable of simultaneous or sequential three color presentation.

These and other objects are effected by our invention as will be apparent from the following description taken in accordance with the accompanying drawings throughout which like reference characters indicate like parts, and in which.

Figure 1:
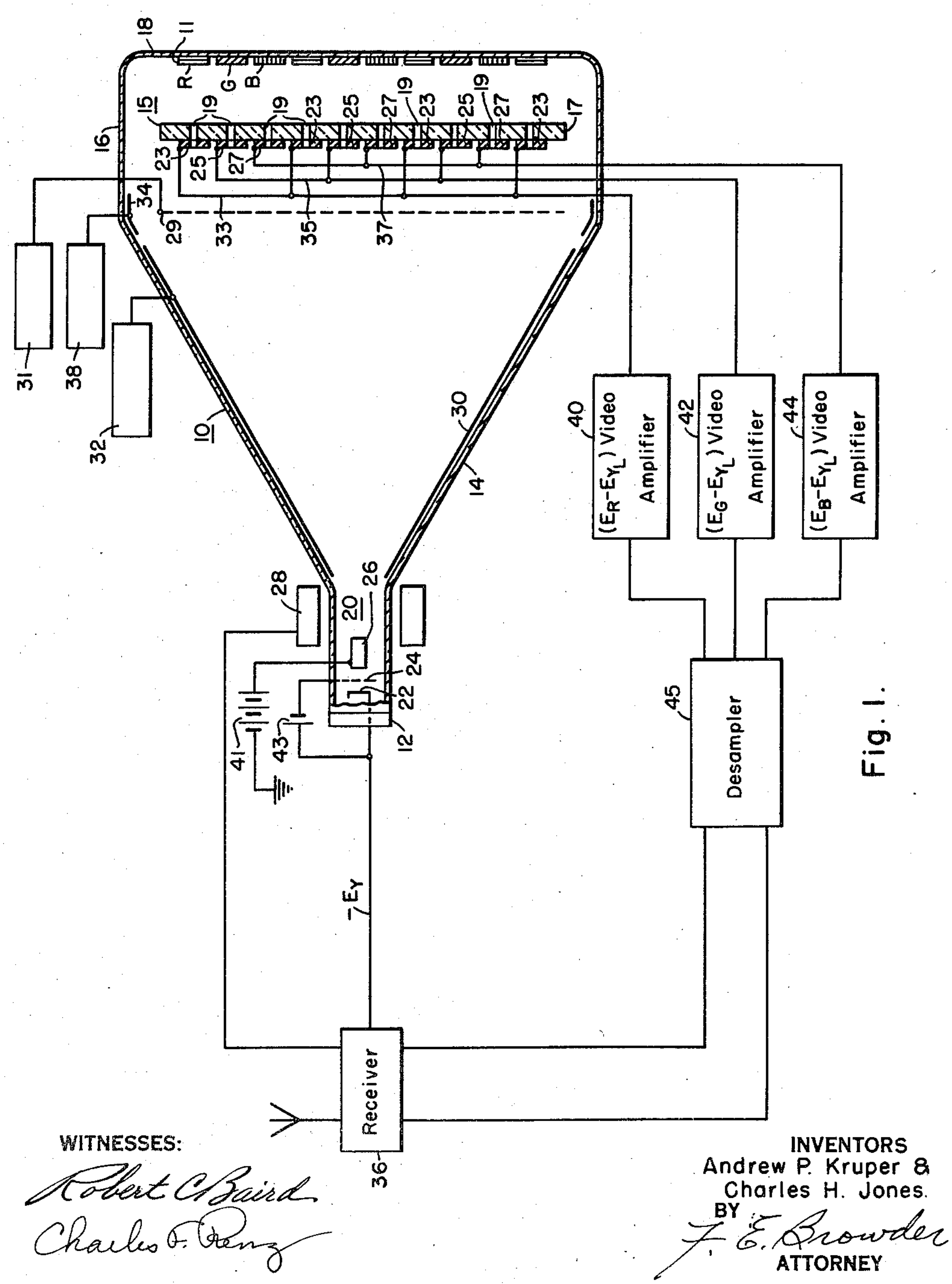
Figure 1 shows a cathode ray tube assembly constructed in accordance with our invention and appropriate circuit means for applying color information to the tube.
Figure 2:
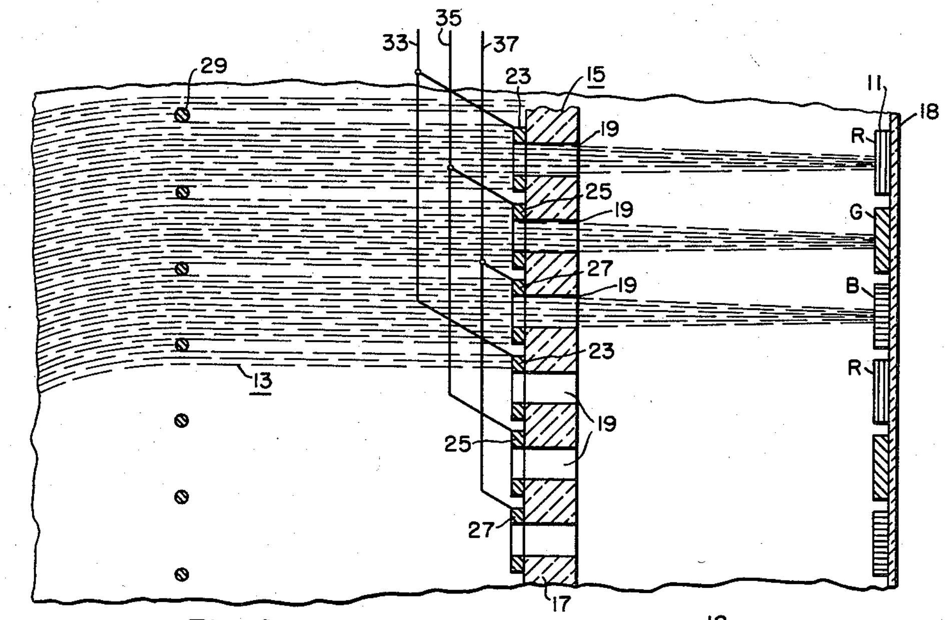
Fig. 2 illustrates an enlarged sectional view of a section of the electrode assembly shown in Fig. 1.
Figure 3:
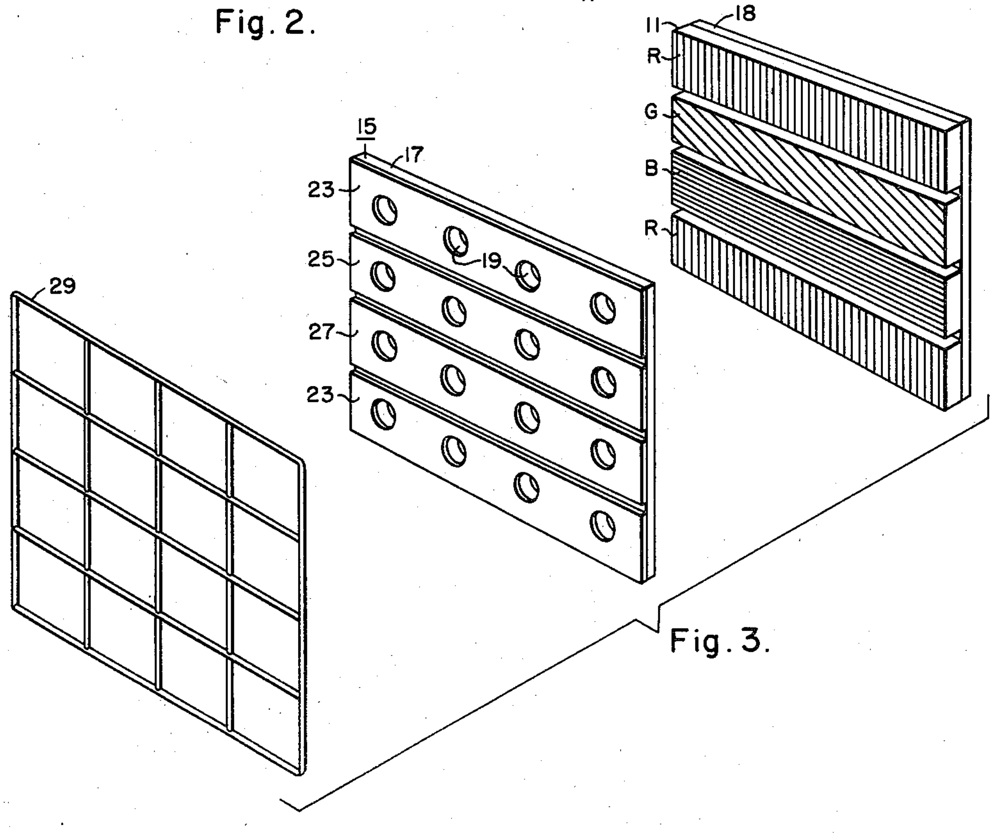
Fig. 3 is an enlarged perspective view of a section of electrode assembly shown in Fig. 1.

Referring in detail to Figs. 1, 2 and 3, a color television tube incorporating our invention is shown in Fig. 1 comprising an evacuated envelope 10 having a neck portion 12, a frustum portion 14, a cylindrical portion 16 and a face portion or window 18. An electron gun 20 is positioned within the neck portion 12 of the evacuated envelope 10 for projecting an electron beam 13. The electron gun 20 comprises at least a cathode 22, a grid 24 and an anode 26. The electron gun 20 may be of any suitable design. A suitable electrostatic or electromagnetic deflection arrangement such as a deflecting coil 28 is provided around the neck portion 12 of the evacuated envelope 10 for the deflection of the electron beam 13, in both the vertical and horizontal directions. A deflection signal derived from a suitable receiver 36 is supplied to the deflection coil 28 to provide the necessary horizontal and vertical scanning control to the electron beam 13.

A first conductive coating 30 is provided on a portion of the interior surface of the frustum portion 14 of the evacuated envelope 10 connected to a suitable voltage source 32. A second conductive coating 34 insulated from the coating 30 is provided on a portion of interior surface of the cylindrical portion 16 and a portion of the interior surface of frustum portion 14 of the envelope 10 connected to a suitable voltage source 38. Although we have shown and described the conductive coatings 30 and 34 within the interior of the envelope for the purpose of electrostatic focusing of the electron beam 13, it is obvious that conducting rings or other suitable structure may also be utilized.

An output screen 11 is positioned near to or deposited on the interior surface of the face or window 18. The output screen 11 is comprised of a plurality of groups of strips R, G and B of a phosphor material capable of emission of light upon electron bombardment. Each strip R, G and B is capable of emission of light of a different selected color component. In the embodiment shown in Fig. 1, a group is composed of the strip R of a phosphor material such as zinc phosphate activated by manganese capable of emission of light of a red color, the strip G of a phosphor material such as zinc silicate activated by manganese capable of emission of light of a green color, and phosphor strip B of a material such as zinc sulphide activated by silver capable of emission of light of a blue color. The strips of material, R, G and B of the output screen 11, may be deposited on the face or window 18 or on a transparent support member near the face 18, by any suitable manner such as silk screening. The phosphor strips R, G and B may be oriented in any direction with respect to the scanning movement of the electron beam 13.

An electron permeable material such as a thin aluminum coating (not shown) may be deposited on the rear side of the output screen 11 facing the electron gun 20 to provide a high voltage electrode and also to increase the light output of the screen 11. A transparent conductive coating such as Nesa may also be utilized on the front side of the screen 11 to provide a suitable voltage electrode.

Between the electron gun 20 and the output screen 11 is provided a color control electrode or grid assembly 15. The color control electrode 15 is parallel to the output screen 11 and is positioned within the cylindrical portion 16 of the envelope 10. The color control electrode 15 is comprised of a supporting layer 17 of any suitable dielectric material, such as glass, and is perforated with apertures or openings 19. The openings 19 are situated in horizontal rows across the supporting layer 17 so that a row of openings 19 is provided in registration with each phosphor strip R, G and B on the output screen 11. A sufficient number of apertures 19 should be provided in each row for the desired resolution. In one specific embodiment, a color control electrode 15 could have openings 19 of approximately 6 mils diameter and 11 mils between centers of apertures in adjacent strips. The distance between and length of opening within same strip is determined by desired resolution and transmission.

A plurality of similar parallel, equally spaced conductive coating strips 23, 25 and 27 are deposited on the surface of the dielectric layer 17. The conductive strips 23, 25 and 27 are in registration with each row of apertures 19 and therefore with the phosphor strips R, G and B. The width of the conductive strips 23, 25 and 27 is substantially the same as the phosphor strips R, G and B. The centers of the apertures 19 are substantially at the center of the conductive strips 23, 25 and 27. The conductive strips 23, 25 and 27 are respectively in registration with the phosphor strips R, G and B. The conductive strips 23, 25 and 27 may be deposited on the dielectric layer 17 by a suitable technique such as evaporation, silk screening, plating, spraying or similar methods so as to be electrically insulated from each other conductive strip by the dielectric layer 17.

The dielectric layer 17 provides a rigid support for the conducting strips 23, 25 and 27 in the same plane and in alignment with the respective phosphor strips R, G and B. Other suitable means may be utilized for support of conductive strips 23, 25 and 27 in place of the member 17.

A grid member 29 is positioned between the electron gun 20 and the color control electrode 15. The grid 29 which may be of a wire mesh structure is substantially parallel to and coextensive with the color control electrode 15. The apertures in the mesh grid member 29 should be in registration with the apertures in the color control grid 15 or a very small mesh may be used where no registry would be required. A suitable voltage source 31 is connected to the grid 29 to supply a suitable voltage thereto.

The conducting strips 23 are all connected together by the conductor 33, and are connected on the outside of the envelope 10 to a video amplifier 40 which supplies color information. The conducting strips 25 are all connected together by the conductor 35 and are connected outside the envelope 10 to a video amplifier 42 which supplies color information. The conducting strips 27 are all connected together by a conductor 37 and connected outside of the envelope 10 to a video amplifier 44 which supplies color information.

The color information derived from a suitable color television receiver 36 such as described in an article entitled, "Compatible Color TV Receiver" by Kenneth E. Farr in the January, 1953 issue of Electronics may be utilized.

The color information derived by a receiver as described in the above-mentioned article may be represented by the brightness or luminosity signal $E_Y$, the red color difference signal $E_R-E_{Y_L}$, the green color difference signal $E_G-E_{Y_L}$ and the blue color difference signal $E_B-E_{Y_L}$. The brightness signal $E_Y$ has a high frequency component $E_{Y_H}$ and a low frequency component $E_{Y_L}$. The term $E_{Y_L}$ used in the color difference signal is referred to in the above-cited article as $E_Y$.

The color difference signals $E_R-E_{Y_L}$, $E_G-E_{Y_L}$ and $E_B-E_{Y_L}$ are obtained from a color decoder circuit 45 of the color television receiving system. The color difference signals $E_R-E_{Y_L}$, $E_G-E_{Y_L}$ and $E_R-E_{Y_L}$ are connected through the respective amplifiers 40, 42 and 44 to the color television tube 10. The output of the amplifiers 40, 42 and 44 are connected by means of the respective conductors 33, 35 and 37 to the respective conducting elements 23, 25 and 27 of the color control grid 15.

The brightness or luminosity signal $(-E_Y)$ obtained from the receiver 36 is connected to the electron gun 20. A suitable voltage represented by battery 43 is connected between the cathode 22 and the control grid 24 of the electron gun 20, while a second voltage source 41 is connected between ground and anode 26 so as to apply a positive voltage thereto.

The operation of our invention may be explained by reference to the drawings in the following manner. The electron gun 20 produces an electron beam 13 within the envelope 10 directed towards the output screen 11. The electron beam 13 is deflected to scan a raster in the plane of the color control electrode 15 by means of the deflection arrangement 28 around the neck portion 12 of the envelope 10. The height of the spot of the electron beam 13 on the color control electrode 15 for simultaneous color presentation would be such that the electron beam spot would cover one group of three conducting strips, 23, 25 and 27 on the color control electrode 15, so that a group of phosphor strips R, G and B on the output screen 11 would be activated in one movement of the electron beam 13 across the screen 11. When scanning the strips transversely, the size of the electron beam is not critical.

The potential of the conducting coating 30 on a portion of the interior surface of frustum section 14 of the envelope 10 will usually be held at a lower voltage than the potential of the grid 29 in order to produce an electrostatic lens action and cause the beam 13 to approach the grid 29 normal to its surface at all points. The shape of 14 is important in achieving proper lens action. It may be bell shaped rather than conical. The ring electrode 34 or conducting coating in the interior of the envelope 10 at a different potential than 30 or 29 may be used to further improve the above lens action. The voltage of the grid 29 will be a potential between one and 10 kilovolts. The main requirement as to the voltages on the grids 29, 30, and is that they be of a value to bring the electron beam 13 in normal over the entire area of the grid 29. It has been found that utilizing only the grid 29 and the conductive coating 30 gives sufficient lens action. In one design, a voltage of 15,800 volts on the grid 29 and a voltage of 2,500 volts on the conducting surface 30 gave the desired lens action so as to bring electron beam 13 in normal to grid 29.

If the grid 29, the control grid assembly 15, and the phosphor screen assembly 18 are all made spherical and have their radius of curvature located at the deflection center of coils 28, then elements 29, 30 and 34 may all be at the same potential because no lens action will be required to bring the electron beam 13 in normal to the grid 29.

The color control electrode 15, positioned between the grid 29 and the output screen 11, may be operated at a potential near that of the cathode 22 of the electron gun 20, and will have the effect of slowing the speed of the electrons in the electron beam 13 down after they pass through the grid 29. The electrons in the electron beam 13 at the rear surface of the color control electrode 15 are now at or near cathode potential and can be acted upon by voltage changes applied to the color control electrode 15 of the same magnitude as that used on a vacuum tube.

The distance between grid 29 and the color control electrode 15 and the output screen 11 should be maintained reasonably small, but sufficient to withstand the voltage gradient involved with a reasonable safety factor. By maintaining the distance between the above-described electrodes 29, 15 and 11 reasonably small, there is little danger of the spreading of the electron beam 13 in its travel between the grid 29 and the output screen 11. The output screen 11 is operated at a very high potential of the order of 15 to 20 kilovolts so as to cause the electrons to accelerate and excite the phosphor strips R, G and B on the output screen 11 to maximum intensity.

If color difference $E_R-E_{Y_L}$, $E_G-E_{Y_L}$ and $E_B-E_{Y_L}$ signals or potentials are now supplied to the color control electrode 15 by means of the video amplifiers 40, 42 and 44, the brightness signal $-E_Y$ is applied to the electron gun 20, an image will be presented on the output screen 11. The voltage on the respective color control conducting strips 23, 25 and 27 determines which holes 19 in the perforated dielectric layer 17 the scanning beam will pass through. If the voltage applied to the conducting strips 23 by the video amplifier 40 by means of the connector 33 is positive with respect to the cathode, the electrons will pass through the apertures 19 and strike the phosphor strip R associated with the conducting strip 23. In our specific embodiment, the phosphor strip R on the output screen 11 will emit light of a red color upon electron bombardment. The video information supplied by the amplifier 40 to the conducting strips 23 modulates the voltage on the conducting strips 23 with respect to the cathode in accord with the red color information being received. If the voltage supplied to the conducting strips 23 from the video amplifier 40 is of a negative nature, the electrons will be prevented from passing through the apertures 19 and the electrons will be turned back to the grid 29 where they will be collected. If it is positive, electrons will pass through 19 and be accelerated toward 18. The conducting strips 25 and 27 are supplied with the green and blue information respectively, and operate in a similar manner to that described for the red information on strips 23. In this manner, the electron beam 13 excites three color phosphors R, G and B simultaneously, and yet each color is independently controlled.

In Fig. 2, we have shown a view illustrating how the electrode assembly will function upon the electron beam 13. The electron beam 13 scans a raster on the grid 29. The grid 29 in conjunction with the conductive coatings 30 and 34 shown in Fig. 1 form an electrostatic lens and cause the electron beam 13 to approach the color control electrode 15 normal or perpendicular thereto. Since the voltage on the color control electrode 15 is close to the cathode potential (within ±20 volts) the electrons within the beam 13 decelerate and the number of electrons passing through the apertures 19 of the conductive strip 23 determine the amount of red light in the image on the output screen 11. The number of electrons passing through the apertures 19 of the conductive strip depends on the red video signal. Since the signal $E_R - E_{Y_L}$ is applied to strip 23 and the signal $-(E_{Y_L}+E_{Y_H})$ is applied to the cathode, the potential difference between cathode and strip 23 is $E_R+E_{Y_H}$. The voltage on the color control electrode 15 is near cathode potential, while the voltage on the output screen 11 is of the order of ten to twenty kilovolts. This voltage difference between the output screen 11 and the color control electrode 15 causes the electrons passing through holes in 23 to be accelerated and focused.

The above description of operation with respect to the conductive strip 23 and associated phosphor strip R also applies to the conductive strips 25 and 27 associated with respective phosphor strips G and B. As explained previously, the brightness of all three colors may be varied by the brightness signal $E_Y$ applied to the electron gun 20 as shown in Fig. 1.

Although the operation of the tube embodied in Fig. 1 has been described for simultaneous type tri-color presentation, it will be obvious that it is possible to apply video information to the electron gun 20, and sequentially switch or gate the three separate color control grids on the color control electrodes 15 comprised of the conductive strips 23, 25 and 27 at a field, line or dot rate for sequential type tri-color presentation.

Also, it is possible to apply the $E_R$, $E_G$ and $E_B$ signals (rather than the color difference signals) to the grids 23, 25 and 27 and the high frequency brightness signal $E_{Y_H}$ to the cathode.

An alternate method of operating the tube is to have the control grid and cathode at fixed potentials and to feed the control grid assembly 15 with the three signals $(E_R+E_{Y_H})$, $(E_G+E_{Y_H})$, and $(E_B+E_{Y_H})$ on leads 33, 35, and 37.

Figure 4:
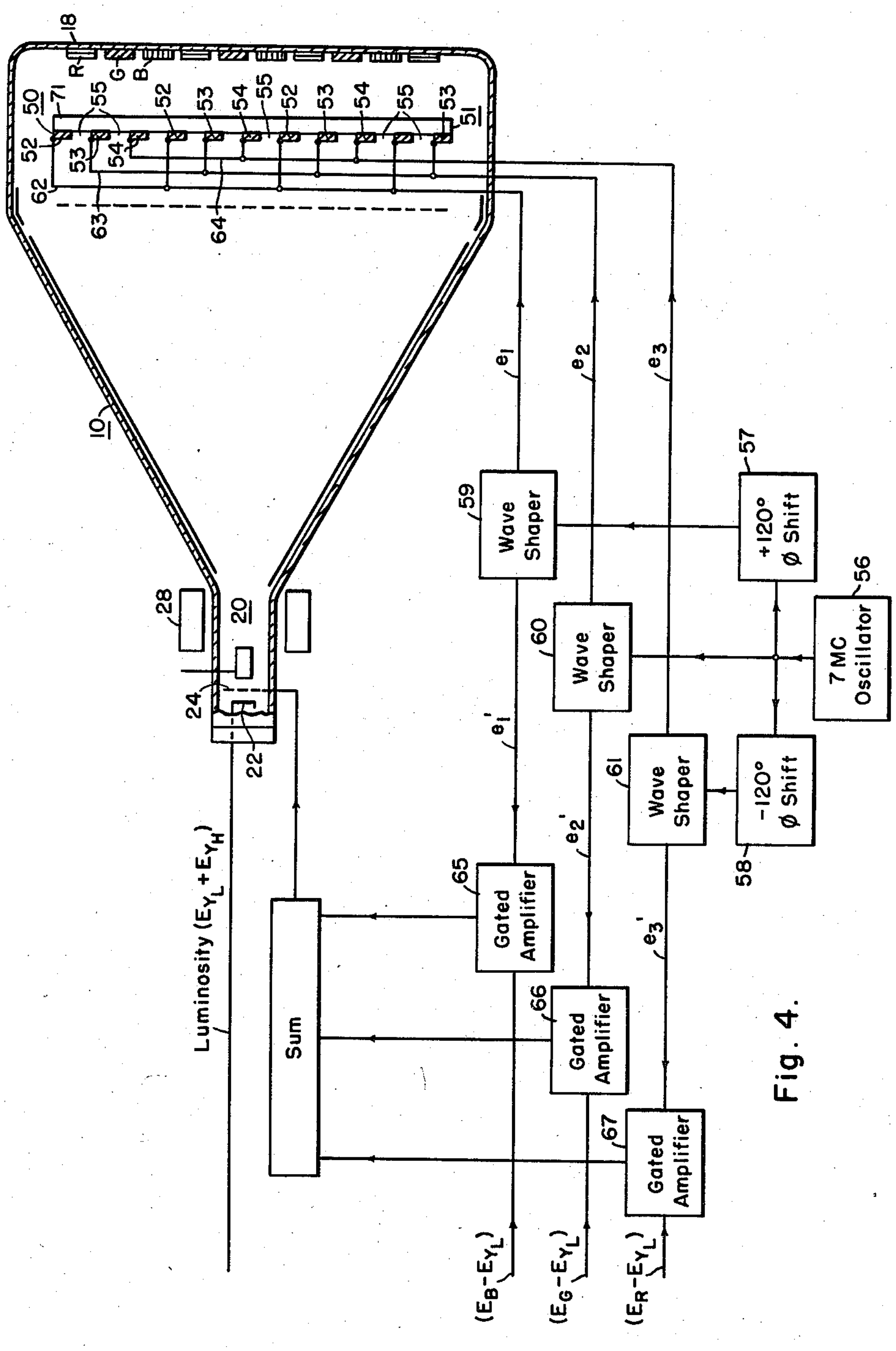
Fig. 4 shows a cathode ray tube assembly constructed in accordance with our invention and appropriate circuit means for sequential presentation of color information.
Figure 6:
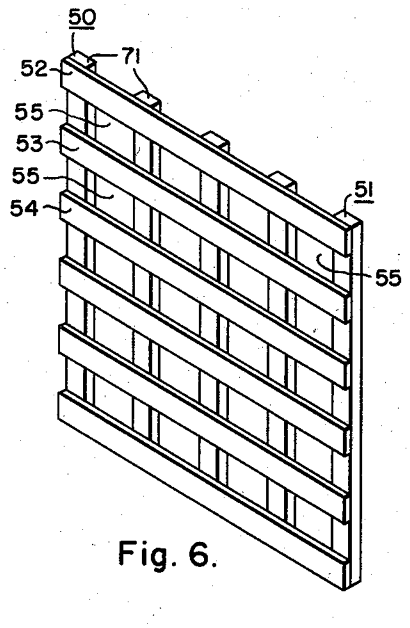
Fig. 6 shows one possible construction of the color control electrode to be utilized in Fig. 4.

Referring in detail to Fig. 4, the cathode ray tube 10 is shown having similar components as that shown in Fig. 1, with the exception of the color control grid. The color control grid 50 shown in the embodiment of Fig. 4 is positioned similarly to the grid 15 in Fig. 1, to the rear of the face plate 18. The color control grid 50 is comprised of a plurality of parallel conducting elements 52, 53 and 54 lying within a plane parallel to the face plate 18. The elements 52, 53 and 54 are positioned midway between the phosphor lines. The elements 52, 53 and 54 denoted by the same numbers are all connected together by the respective conductors 62, 63 and 64. A suitable supporting member 51 may be provided for the elements 52, 53 and 54 and may take the form of insulating members 71 placed transversely to the elements 52, 53 and 54 as shown in Fig. 6. An alternate arrangement is to support these conductors at their ends by an insulating cement eliminating the need for any insulating material within the picture area. In Fig. 4, a planar support member 51 is utilized having rows of apertures 55 positioned between the elements 52, 53 and 54.

As previously explained with reference to Fig. 1, the image screen comprises a plurality of groups of phosphor strips, R, G and B. The color strips or sections R, G and B are substantially of the same width as the distance between the parallel elements 52, 53 and 54 of the color control grid 50. In Fig. 4, the elements 52, 53 and 54 are positioned so that the space between adjacent elements 52, 53 and 54 is opposite to and in registration with a color strip R, G or B.

A block circuit is shown in connection with the cathode ray tube 10 shown in Fig. 4 which may be utilized for sequential type presentation of color television. A sine wave oscillator 56 is provided with two phase shift circuits 57 and 58 so as to provide three sine waves that are 120° apart in phase. The frequency of the oscillator may be in the order of three to ten megacycles for dot sequential presentation. The three signals −120° phase shift, 0° phase shift and +120° phase shift derived from the oscillator 56 and the phase shift circuits 57 and 58 are applied to the respective wave shapers 59, 60 and 61 where the sine waves are unsymmetrically clipped to obtain three rectangular waves $e_1$, $e_2$ and $e_3$. The voltages $e_1$, $e_2$ and $e_3$ are positive for 240° and negative for 120°. The voltages $e_1$, $e_2$ and $e_3$ are applied respectively through the conductors 62, 63 and 64 to the respective grid elements 52, 53 and 54. The voltages $e'_1$, $e'_2$ and $e'_3$ are also obtained from the respective shapers 59, 60 and 61 and are used to gate the respective amplifiers 65, 66 and 67. They are positive for 120° and negative for 240°. The color portion of the color television signal received by a receiver of suitable design and of the NTSC standard such as described in the article "Compatible Color TV Receiver" by K. E. Farr in January issue of Electronics, 1953, applies color difference signals represented by $(E_B-E_{Y_L})$, $(E_G-E_{Y_L})$ and $(E_R-E_{Y_L})$ to the respective gated amplifiers 65, 66 and 67. The outputs of the three gated amplifiers 65, 66 and 67 are added and applied to a control electrode 24 of the electron gun 20. By means of the voltages $e'_1$, $e'_2$ and $e'_3$ obtained from the oscillator the respective color difference signals $(E_B-E_{Y_L})$, $(E_G-E_{Y_L})$ and $(E_R-E_{Y_L})$ are applied to the control grid 24 of the electron gun 20 in rapid sequence so that each signal is on for approximately 1/21 microsecond. The luminosity signal $E_Y$ derived from the receiver is applied to the cathode 22 of the electron gun 24.

The operation of the device shown in Fig. 4 is similar to the device shown in Fig. 1 in that the electrons in the electron beam 13 are permitted to pass only through selected apertures 55 in the color control screen 50. In the device shown in Fig. 1, only one color control strip need be positive to allow the electron beam 13 to pass, while in the device of Fig. 4 it is necessary that two of the adjacent elements 52, 53 and 54 be positive to permit the passage of the electron beam 13 between the two positive elements. Since, as previously described, the voltages $e_1$, $e_2$ and $e_3$ that are applied to the color control grid 50 are positive for 240° and negative for 120°, then two of the color control wires 52, 53 and 54 will be positive at all times allowing the electron beam 13 to pass.

Figure 5:
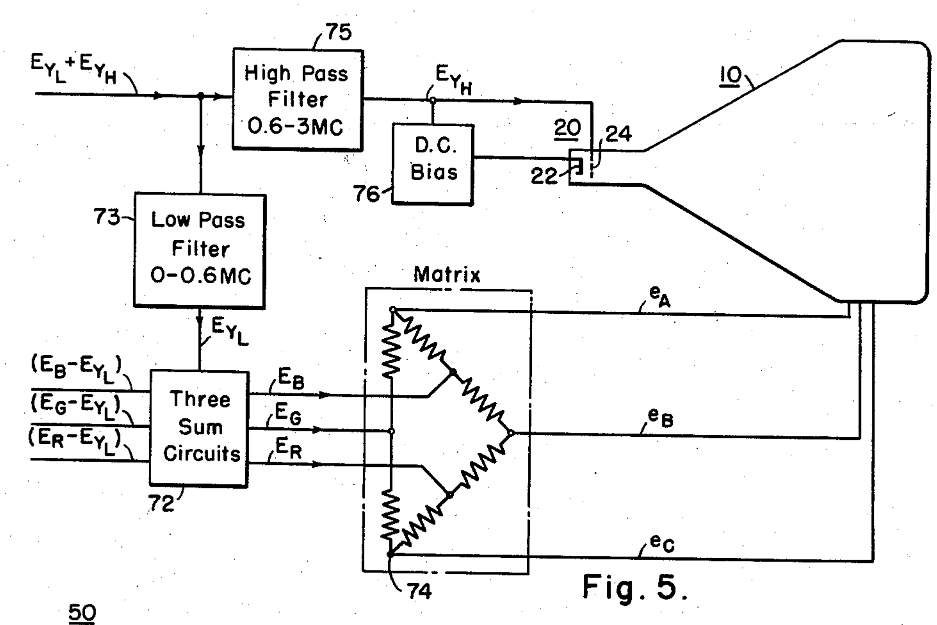
Fig. 5 shows a cathode ray tube similar to that shown in Fig. 4 with appropriate circuit means for simultaneous presentation of color information.

In Fig. 5, we have indicated by block diagram means for presenting simultaneous type presentation of color television in the embodiment shown in Fig. 4 and utilizing the signal derived from a conventional NTSC type receiver. In the circuit shown in Fig. 5, three voltages $e_A$, $e_B$ and $e_C$ are derived from the respective color difference signals $(E_B-E_{Y_L})$, $(E_G-E_{Y_L})$ and $(E_R-E_{Y_L})$. The color difference signals $(E_B-E_{Y_L})$, $(E_G-E_{Y_L})$ and $(E_R-E_{Y_L})$ are coupled to three sum circuits represented by the block 72. The luminosity signal $E_Y=(E_{Y_L}+E_{Y_H})$ is connected to the three sum circuits 72 through a low pass filter 73 which passes substantially the frequencies between zero and 0.6 megacycle of $E_{Y_L}$ of the luminosity signal. Three outputs representative of the respective colors $E_B$, $E_G$ and $E_R$ are connected to a matrix circuit 74 comprised of resistor network to obtain the desired values of $e_A$, $e_B$ and $e_C$. The signals applied to the grid elements 52, 53 and 54 of the cathode ray tube 10 are equal to $$e_A=\frac{E_G+E_B}{2},\quad e_B=\frac{E_B+E_R}{2}$$

and $$e_C=\frac{E_R+E_G}{2}$$

Suitable bias may be added to the signals for the proper color reproduction. The luminosity signal $E_{Y_L}+E_{Y_H}$ is also coupled through a high pass filter 75 which substantially passes the frequencies between 0.6 and 3.5 megacycles or $E_{Y_H}$ to the control electrode 24 of the electron gun 20. A D. C. bias 76 is applied between the cathode 22 of the electron gun 20 and the grid 24.

Figure 7:
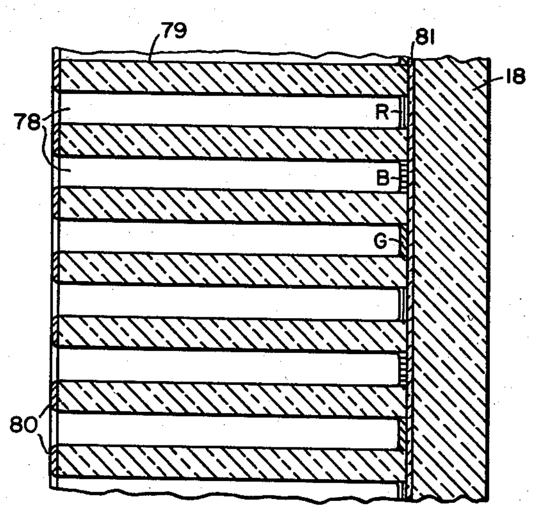
Fig. 7 shows another possible construction of the target structure to be utilized in the tube shown in Fig. 4.

In Fig. 7, we have shown a cross-sectional view of another possible construction of the color control electrode which may be utilized in which holes 78 are photoetched in glass 79 of substantial thickness with conducting strips 80 located at one end thereof and with a Nesa plate 81 located at the other end thereof. The plane passing through the conducting strips 80 is substantially located in the same position as the color control grid previously described in the other embodiments, while the phosphor strips R, G and B are deposited on the Nesa surface in registration with the photoetched holes 78. The Nesa plate 81 is positioned adjacent to the face plate 18 of the cathode ray tube 10.

Figure 8:
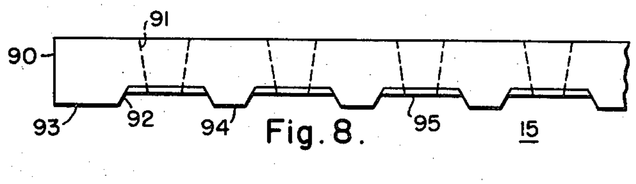
Fig. 8 is a side view of a modified color control grid which may utilize the tube shown in Fig. 1.
Figure 9:
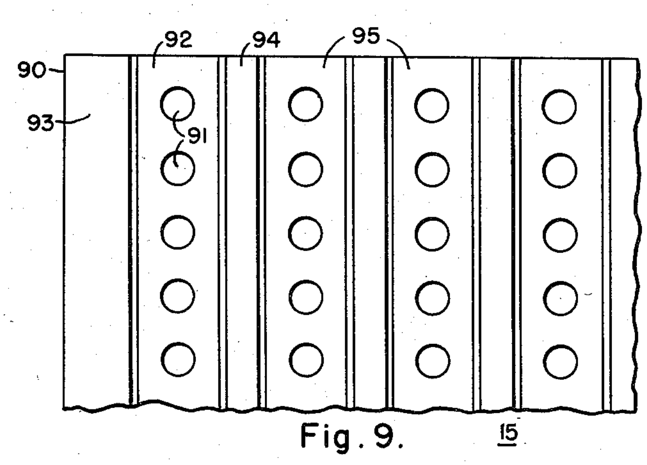
Fig. 9 is a front view of the color control grid shown in Fig. 8.

In Figs. 8 and 9, there is shown a modification of the control grid 15 shown in Fig. 1. A sheet of photoetched glass 90 is prepared by double exposure and etching process to obtain holes 91 and groves 92 as indicated in Figs. 8 and 9. A conductive material such as metal is evaporated from the side 93 so that the entire surface 93 is covered. The conductive material may or may not be deposited on the inside surfaces of the holes 91 depending on the taper. After the evaporation, the surface 93 is ground, lapped or scraped to remove the conductive material from the ridges 94 between the grooves 92. This leaves a series of conductive perforated strips 95 insulated from each other.

Figure 10:
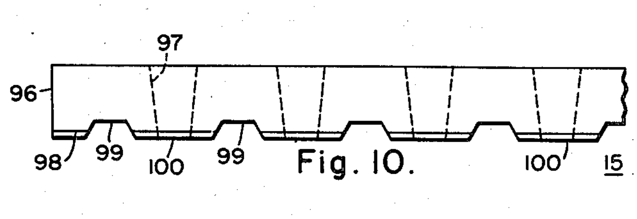
Fig. 10 is a side view of another modified color control grid which may be utilized in the tube shown in Fig. 1.
Figure 11:
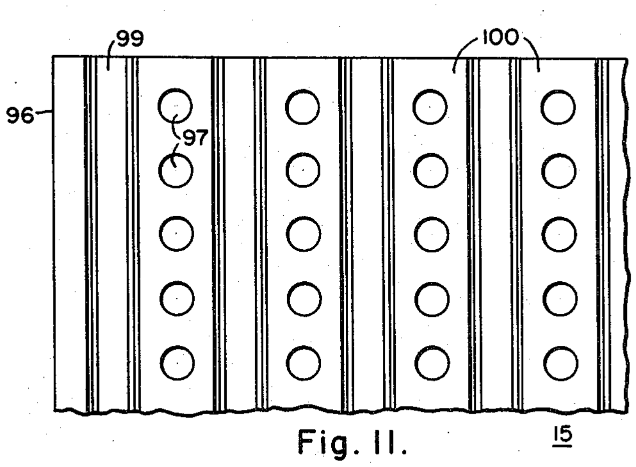
Fig. 11 is a front view of the color control grid shown in Fig. 10.

In Figs. 10 and 11, an alternate construction is shown of the color control grid 15. Again a photoetched glass plate 96 is prepared by double exposure and etching process to obtain apertures 97. Grooves 99 are etched on the surface 98 midway between the apertures 97 and are then filled with a soft or low melting temperature material such as wax. A conductive film such as gold, silver or aluminum is evaporated on the surface 98 and then the wax is scraped or melted out removing the conductive film deposited on the surface above the grooves 99. This again gives perforated conducting strips 100 insulated from each other.

While we have shown our invention in several forms, it will be obvious to those skilled in the art that is not so limited, but is susceptible of various changes and modifications without departing from the spirit thereof.

We claim as our invention:

1. A color television image tube comprising an evacuated envelope, an output screen positioned at one end of said envelope, said output screen including a plurality of groups of strips of material capable of emitting light upon electron bombardment, each of said groups containing strips capable of emitting light of the selected component colors and each strip limited in representation to only one color, an electron gun positioned adjacent the other end of said envelope for projecting a beam of electrons towards said output screen, deflection means for scanning a raster on said output screen, a perforated color control electrode positioned between said output screen and said electron gun, said color control electrode comprising a layer of dielectric material having a conductive material thereon, said conductive material being positioned on the side of said dielectric material facing said electron gun and in the form of strips aligned with the light emitting strips on said output screen, means for applying a potential to said conductive strips, a grid electrode positioned between said electron gun and said color control grid, and means for applying a potential to said grid.

2. A color television image tube comprising an evacuated envelope, an output screen positioned adjacent one end of said envelope, said output screen including a plurality of groups of strips of phosphor material capable of emitting light on electron bombardment, each of said groups containing strips representing respectively, red green and blue colors, an electron gun positioned adjacent the other end of said envelope for projecting a beam of electrons toward said output screen, deflection means for scanning said electron beam to obtain a raster on said output screen, electrostatic means consisting of conducting coatings within the interior of the envelope for normalizing the electron beam from said electron gun as it approaches the output screen, a color control grid positioned between said output screen and said electron gun near to said output screen, said color control grid comprising a plurality of perforated conducting strips so that a conducting strip is positioned parallel with and in front of each of said strips of material on said output screen, said conductive strips being insulated from each other and means connecting all of the conductive strips positioned in front of the strips on the output screen emitting the same color to a terminal exterior of said envelope.

3. A color television image tube comprising an evacuated envelope enclosing an output screen, an electron source with means for scanning a raster on said output screen, said output screen comprising a plurality of groups of strips of material, each of said groups including strips capable of emitting light of respective different colors upon electron bombardment, a perforated color control grid parallel to said output screen and positioned between said output screen and said electron source, said color control grid having a control strip for each of said light emitting strips aligned therewith, said control strips which are aligned with light emitting strips of the same color emission being connected together and insulated from the others, and a planer grid parallel to said color control grid and positioned between said electron source and said color control grid.

4. A color television image tube comprising an evacuated envelope, said envelope having a viewing screen positioned at one end thereof, an electron source with means for scanning a raster on said viewing screen positioned adjacent the opposite end of said envelope, said viewing screen comprising a plurality of groups of light emitting strips of material each of said groups having three strips capable respectively of emitting light of red, blue and green color upon electron bombardment, a first control electrode positioned between said viewing screen and said electron source, said first control electrode comprising a layer of perforated dielectric material with a plurality of conducting strips positioned on said dielectric material on the side facing said electron source, said conductive strips being parallel to and in alignment with said light emitting strips on said output screen, means for applying potential to said conductive strips, a second control electrode parallel to said first control electrode and positioned between said electron source and said first control grid, and electrostatic lens means for normalizing the electrons approaching said first control electrode from said electron source.

5. A color television tube comprising an evacuated envelope enclosing an output screen and an electron source with means for scanning a raster on said output screen, said output screen comprising a plurality of groups of horizontal strips of phosphor, each of said groups containing phosphor strips capable of emitting light for each of the selective component colors when excited by electrons, a perforated color control grid positioned between said output screen and said electron source, said color control grid comprising a dielectric material and conductive strips on the side of the dielectric material facing said electron source, means connecting those conductive strips which are in registration with those phosphor strips emitting the same color to three output terminals, a planer grid parallel to said color control grid and positioned between said electron source and said color control grid, and electrostatic lens means for normalizing the electrons from said electron source as they approach said color control grid.

6. A color television image tube, comprising in combination, an image screen having a plurality of discrete elemental areas of phosphor material, capable of emission of light of selected component colors upon electron bombardment, each of said elemental areas of phosphor material capable of emission of light of only one of said selected component colors, means for generating, projecting and deflecting an electron beam so as to scan a raster on said image screen, an apertured control electrode positioned between said image screen and said electron beam generating means, said control electrode having a plurality of elemental sections, each of said elemental sections of similar area and substantially in registration with said elemental areas of said image screen and means for controlling electron flow through sections of said control electrode in response to a monochrome video signal applied thereto representative of the color emission of said elemental area of phosphor in registration therewith on said image screen.

7. A color television image tube, comprising in combination, an output screen having a plurality of discrete elemental areas of phosphor material representative of selected component colors, each of said elemental areas of phosphor material capable of emission of light of only one selected component color upon electron bombardment, means for generating, projecting and deflecting an electron beam so as to scan a raster on said image screen, an apertured control electrode positioned between said image screen and said electron beam generating means, said control electrode having a plurality of elemental control sections, each of said elemental control sections having substantially the same area and in registration with said elemental areas of said image screen, electrostatic lens means for focusing said electron beam normal to said control electrode, means for operating said control electrode near the cathode potential of said electron generating means, means for applying a monochrome video signal to selected elemental sections of said control electrode representative of the color emission of said elemental area of phosphor in registration therewith on said image screen, and means for applying a relatively high potential to said image screen with respect to said control electrode so as to converge and accelerate the electrons after passing through the apertured control electrode.

References Cited in the file of this patent

UNITED STATES PATENTS

| | | |
|---|---|---|
| Re. 23,672 | Okolicsanyi | June 23, 1953 |
| 2,259,506 | Young et al. | Oct. 21, 1941 |
| 2,577,368 | Schultz et al. | Dec. 4, 1951 |
| 2,595,617 | Toulon | May 6, 1952 |
| 2,646,521 | Rajchman | July 21, 1953 |
| 2,660,684 | Parker | Nov. 24, 1953 |
| 2,692,532 | Lawrence | Oct. 26, 1954 |
| 2,734,146 | Noskowics | Feb. 7, 1956 |
| 2,754,357 | Pensak | July 10, 1956 |

FOREIGN PATENTS

| | | |
|---|---|---|
| 443,896 | Great Britain | Mar. 10, 1936 |